June 19, 1956     M. W. MacAFEE ET AL     2,751,037
MIST ELIMINATOR
Filed July 20, 1953
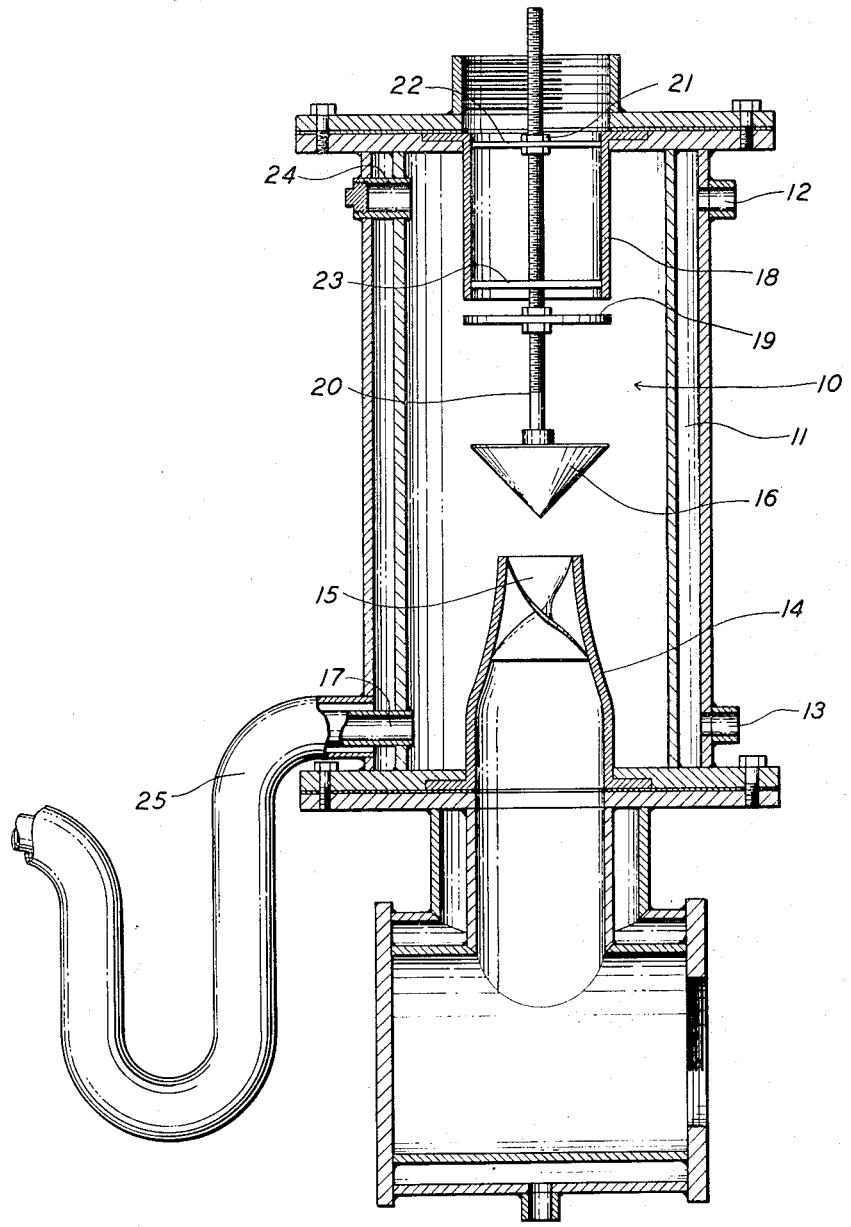
INVENTORS.
MERRILL W. MacAFEE
HERMAN A. RUTH
BY
*James B Christie*
ATTORNEY United States Patent Office 2,751,037
Patented June 19, 1956

2,751,037

MIST ELIMINATOR

Merrill W. MacAfee and Herman A. Ruth, Los Angeles, Calif., assignors to Pacific Foundry Company, Ltd., San Francisco, Calif., a corporation of California Application July 20, 1953, Serial No. 368,892

6 Claims. (Cl. 183—32)

This invention relates to a mist eliminator and, more particularly, to such a device which will cause mist suspended in a gas stream to coalesce into droplets for collection and recovery.

The invention is of utility in recovering liquid mist from gas streams of any origin, but is particularly suitable for removing sulphur mist from gas streams produced by a sulphur vaporizing furnace after these have been passed through a condenser as described and claimed in copending application Serial No. 358,008, filed May 28, 1953. Such gas streams contain sulphur mist which has escaped the condenser and which our device causes to coalesce into droplets for recovery in the form of a stream of liquid sulphur.

In essence, our invention contemplates such a device having a housing with an inlet pipe disposed in one end, the inlet pipe having a vane for causing the entering gas stream to swirl in the housing around the axis of the inlet pipe. A deflector is disposed in the housing on the axis of the inlet pipe. The deflector is of increasing cross-section in a direction away from the inlet pipe so as to increase the deflection and centrifugal movement of the gas stream. A gas outlet is provided in the opposite end of the housing.

In the preferred form of our invention, our mist eliminator contains a chamber through which the gas stream is passed. Because sulphur is a free-flowing liquid only at a limited range of temperatures, the chamber is surrounded by a steam or hot water jacket which maintains a proper temperature inside the chamber to keep the sulphur in a liquid state. The gas stream enters the chamber through an inlet nozzle which is provided with a 180° twisted vane to cause a swirling centrifugal action. As the stream flows out of the nozzle, it encounters the point of a conical deflector and is deflected by it and by the centrifugal action against the walls of the chamber. An outlet nozzle is positioned so that its inner end projects a considerable distance into the chamber. A baffle is positioned directly adjacent the inner end of the outlet nozzle to prevent the direct entry of the gas stream into the outlet nozzle. It is necessary for the gas stream to be deflected from the outlet end of the chamber back toward the center and to pass through a narrow opening between the outlet nozzle and the baffle before it can escape from the chamber.

Sulphur mist is difficult to coalesce because it has a high surface tension and often carries an electrical charge which resists its attachment to the walls of the chamber. With our invention, we overcome this tendency of the sulphur mist to remain suspended in the gas stream by causing the stream to be propelled at a high velocity, so that the mist impinges against the walls of the chamber a number of times in passing through the chamber. This impingement and violent tangential action is important in causing the mist to coalesce.

Our device is so constructed that it is easy to surround the coalescing chamber with a steam or hot water jacket. It has the further advantage that it is reversible and can be used so that the gas stream flows in either an upward or a downward direction, depending upon the direction of flow of the gas stream at the point where the device is used or upon other considerations.

The invention will be more clearly understood from the following detailed description taken in relation to the accompanying drawing, in which the figure is a sectional elevation of a preferred embodiment of our invention.

The preferred embodiment which as been selected to illustrate our invention comprises an upright cylindrical coalescer chamber 10, which is surrounded by a steam or hot water jacket 11. Steam or hot water passes into this jacket through a steam inlet 12 and circulates around the chamber in order to maintain a temperature of such nature that the sulphur will remain in a liquid state. Steam passes out of the jacket through a steam outlet 13.

The gas stream from a sulphur condenser (not shown) enters the coalescer chamber through an inlet nozzle 14, which projects into the chamber along its longitudinal axis and is tapered at its forward end in order to increase the velocity of the gas stream as it enters the chamber. The inlet nozzle is provided with a diametrically-disposed 180° twisted vane 15 which causes a swirling centrifugal action to take place as the gas stream emerges from the front end of the inlet nozzle.

From the inlet nozzle, the gas stream passes a short distance into the chamber and there encounters the point of a 90° conical deflector 16, which is positioned on the longitudinal axis of the inlet nozzle. The conical deflector and centrifugal action cause the gas stream to be deflected directly against the walls of the chamber. As the gas stream strikes the walls at a high velocity, some of the sulphur mist is collected into droplets, which flow downwardly along the walls and form a stream of liquid sulphur which flows out of a sulphur outlet 17. Because the inlet nozzle projects into the coalescer chamber above the sulphur outlet, the sulphur collected does not flow back into the nozzle.

Due to its high velocity and centrifugal action, the gas stream strikes and is deflected from the side walls of the chamber and flows toward an outlet pipe 18, the inner end of which extends into the chamber opposite the inlet. Before the gas stream can enter the outlet, it strikes a baffle 19, which is positioned adjacent the inner end of the outlet pipe and is spaced a short distance therefrom.

The gas stream will either strike the baffle, from which it is again deflected toward the walls of the chamber, or will enter the area bounded by the outer wall of the outlet pipe, the chamber walls and the opposite end of the chamber. In any case, the gas stream will be forced to impinge repeatedly against the surfaces of the chamber, conical deflector, baffle and outlet pipe. At all of these places, and particularly along the chamber walls, the mist will coalesce into droplets, which flow into the bottom of the chamber, forming a stream of liquid sulphur which flows out of the sulphur outlet.

Before the gas stream can escape from the chamber, it must enter the area between the baffle and the outlet pipe and then enter the inner end of the outlet pipe. This prevents the exit of the gas stream until a considerable amount of coalescence of the sulphur mist contained therein has been obtained.

In the preferred embodiment illustrated, the conical deflector and baffle are mounted on a shaft 20, which extends into the chamber from the outlet end and extends along the longitudinal axis of the chamber and inlet nozzle. A threaded nut 21 is mounted on the top of the chamber, in order to adjust the positioning of the conical deflector. Two guide bars 22 and 23 extend transversely across the outlet nozzle and have round openings through which the shaft passes and is held. The baffle is threaded on the rod and can be rotated to adjust its position with respect to the outlet pipe. The conical deflector and baffle may be mounted independently of each other or in any suitable manner other than that described above. We prefer to have both the conical deflector and the baffle adjustable, since a different type of inlet nozzle may be used under different conditions. The inlet nozzle may be replaced and the conical deflector and baffle adjusted to correlate with the new inlet nozzle.

Attached to the sulphur outlet 17 is a U-shaped leg 25, which acts as a hydraulic seal. The leg may be steam traced, gutted or jacketed and should be of a length sufficient to counteract the vacuum or pressure of our mist eliminator and act as a seal.

In order to make our device completely reversible, a second sulphur outlet 24 is provided at the end of the chamber adjacent the outlet pipe. If our device is used with a downward flow, the operation is the same as that described above, except that the liquid sulphur flows out of the second sulphur outlet and the first sulphur outlet is closed. The walls of the gas outlet pipe extend sufficiently far into the chamber to prevent the liquid sulphur from entering or flowing out of the gas oulet pipe if the device is mounted upside down.

As an example of the results obtained by our mist eliminator, the chamber used had a diameter of 8 inches and a length of 20 inches. The entrance velocity of the gas at the inlet nozzle was in the range of 2000 to 6000 feet per minute. The gas stream from the condenser to the mist eliminator at a temperature of 260° F. contained 4.5 pounds of sulphur per 1000 cubic feet of gas. Of this amount, 2.65 pounds of sulphur or 59% was collected in the eliminator. The balance of the sulphur, which was not collected, was in the form of a true vapor or a sulphur aerosol so fine that it could not be coalesced.

Our device may be operated under either positive or negative pressure, but in either case the pressure differential on the system should be sufficient to impart the proper velocity to the gas as it enters the inlet nozzle. This velocity may vary from 2000 to 6000 feet per minute. In use, our mist eliminator causes only a slight drop in the pressure of the gas stream.

We claim:

1. In a device for removing mist from a gas stream, the combination which comprises a housing, an inlet pipe projecting into one end of the housing, a twisted vane disposed in the inlet pipe for imparting a swirling action to the entering gas stream, an outlet pipe projecting into the other end of the housing opposite the inlet pipe, a plate baffle disposed in the housing and spaced therefrom at its periphery between the outlet and inlet pipe and close to but spaced from the outlet pipe, means for adjusting the spacing between the outlet pipe and the plate baffle, a substantially conical baffle disposed between the plate baffle and the inlet pipe with the point of the conical baffle facing the inlet pipe, a drain connected to the end of the housing into which the inlet pipe projects with the inlet pipe projecting into the housing beyond this drain and a second drain connected to the other end of the housing into which the outlet pipe projects with the outlet pipe projecting into the housing beyond this second drain.

2. In a device for removing mist from a gas stream, the combination which comprises a housing, an inlet pipe projecting into the housing, a twisted vane disposed in the inlet pipe for imparting a swirling action to the entering gas stream, an outlet pipe projecting into the housing opposite the inlet pipe, a plate baffle disposed in the housing and spaced therefrom at its periphery between the outlet and inlet pipe and close to but spaced from the outlet pipe, means for adjusting the spacing between the outlet pipe and the plate baffle, a substantially conical baffle disposed between the plate baffle and the inlet pipe and spaced from the inlet pipe with the point of the conical baffle facing the inlet pipe, and means for adjusting the spacing between the inlet pipe and the conical baffle.

3. In a device for removing mist from a gas stream, the combination which comprises a housing, an inlet pipe projecting into the housing, a twisted vane disposed in the inlet pipe for imparting a swirling action to the entering gas stream, an outlet pipe projecting into the housing opposite the inlet pipe, a plate baffle disposed in the housing between the outlet and inlet pipe and close to but spaced from the outlet pipe, a substantially conical baffle disposed between the plate baffle and the inlet pipe with the point of the conical baffle facing the inlet pipe, a rod projecting into the outlet pipe from the housing with the two baffles mounted on it, means for adjusting the spacing of the plate baffle with respect to the outlet pipe, and means for adjusting the spacing of the conical baffle with respect to the inlet pipe.

4. Apparatus according to claim 3 provided with a heating jacket on the housing.

5. Apparatus according to claim 3 with a drain connected to the housing adjacent one of the pipes.

6. Apparatus according to claim 3 provided with a support for the rod disposed in the outlet pipe, with the rod threaded through the support and with the plate baffle threaded on the rod, the conical baffle being mounted on an end of the rod within the housing.

References Cited in the file of this patent

UNITED STATES PATENTS

| | | |
|---|---|---|
| 382,948 | Bruce | May 15, 1888 |
| 680,717 | Labadie | Aug. 20, 1901 |
| 815,656 | Swartwout | Mar. 20, 1906 |
| 915,505 | Swartwout | Mar. 16, 1909 |
| 961,037 | Spencer | June 7, 1910 |
| 1,122,371 | Douglas | Dec. 29, 1914 |
| 1,420,954 | Bickel et al. | June 27, 1922 |
| 1,870,947 | Drumgold | Aug. 9, 1932 |

FOREIGN PATENTS

| | | |
|---|---|---|
| 465,897 | Great Britain | May 14, 1937 |
| 747,830 | France | Apr. 4, 1933 |